Figure 2:
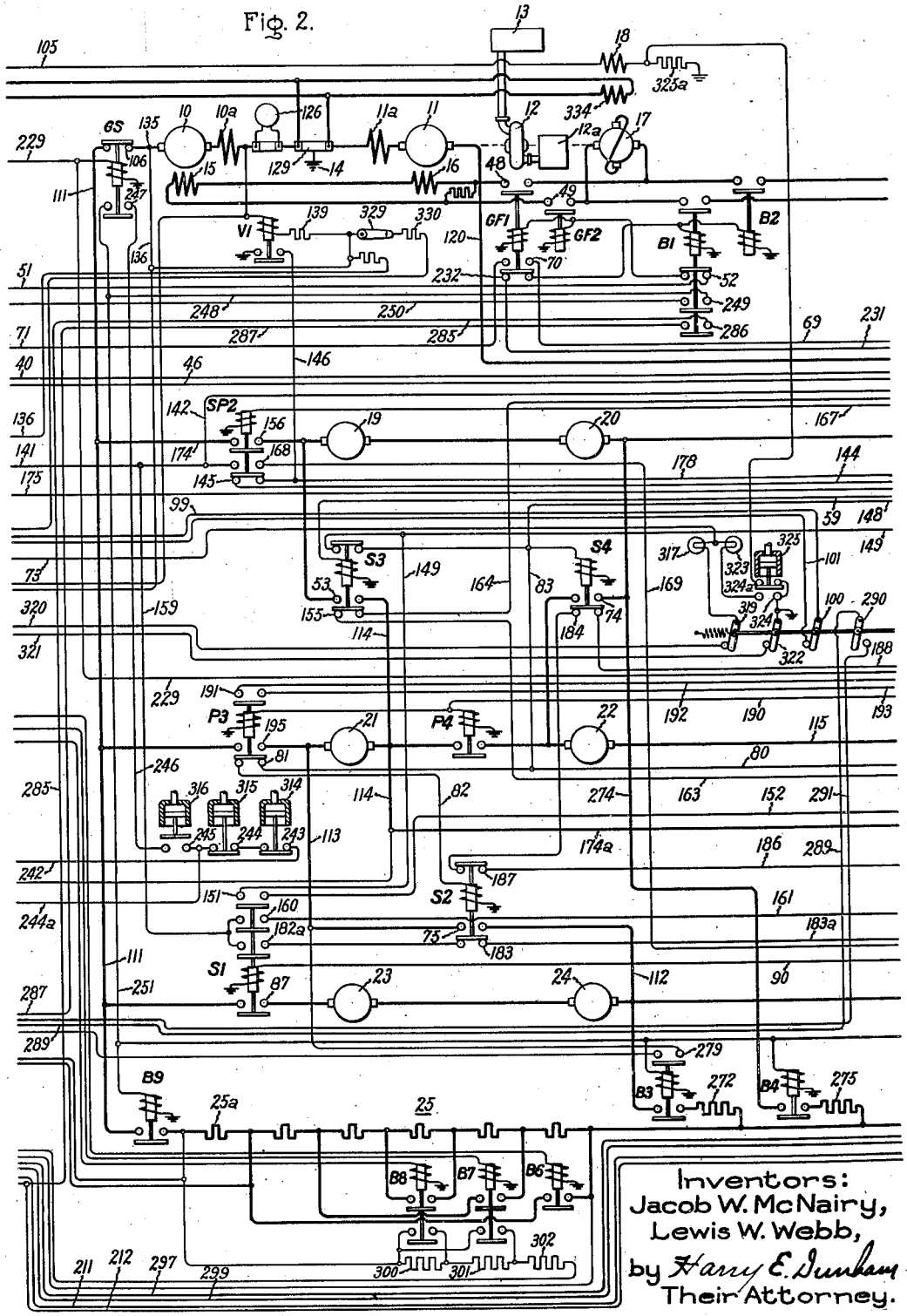

March 17, 1942.                L. W. WEBB ET AL                2,276,812
                          ELECTRIC VEHICLE DRIVE SYSTEM
                    Filed Jan. 12, 1939         6 Sheets-Sheet 1

Fig. 1.

Inventors:
Jacob W. McNairy,
Lewis W. Webb,
by Harry E. Dunbar
Their Attorney.

March 17, 1942.   L. W. WEBB ET AL   2,276,812
ELECTRIC VEHICLE DRIVE SYSTEM
Filed Jan. 12, 1939   6 Sheets-Sheet 3

Inventors:
Jacob W. McNairy,
Lewis W. Webb,
by Harry E. Dunham
Their Attorney.

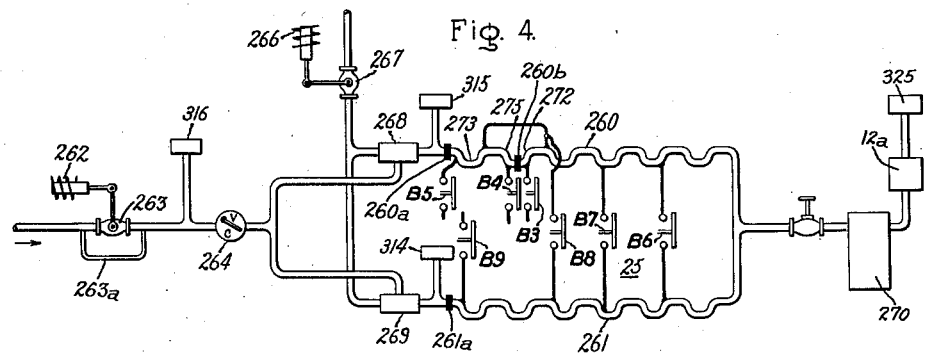

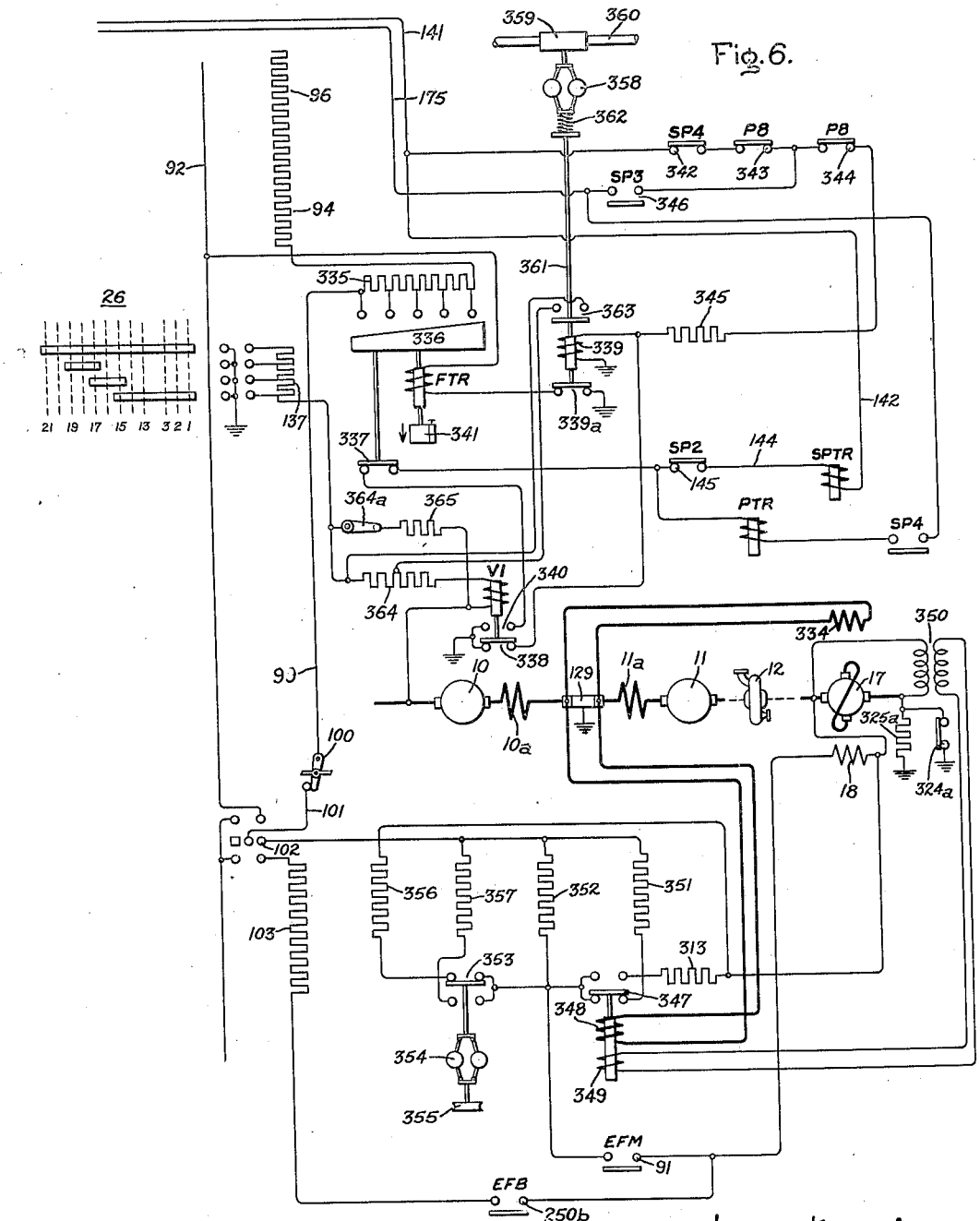

March 17, 1942.  L. W. WEBB ET AL  2,276,812
ELECTRIC VEHICLE DRIVE SYSTEM
Filed Jan. 12, 1939  6 Sheets-Sheet 6

Inventors:
Jacob W. McNairy,
Lewis W. Webb,
by Harry E. Dunham
Their Attorney.

Patented Mar. 17, 1942

2,276,812

UNITED STATES PATENT OFFICE 2,276,812

ELECTRIC VEHICLE DRIVE SYSTEM

Lewis W. Webb and Jacob W. McNairy, Erie, Pa., assignors to General Electric Company, a corporation of New York Application January 12, 1939, Serial No. 250,532

25 Claims. (Cl. 303—3)

This invention relates to electric vehicle drive systems, more particularly steam driven prime mover systems, and has for its object a flexible and reliable electric braking system and combined electric and mechanical braking system for vehicles.

More particularly, our invention relates to turboelectric locomotives in which the steam energy generating apparatus as well as the electric driving motors and the control therefor are all located on the locomotive itself. This apparatus includes a steam boiler with heating means therefor, a steam turbine for driving the electric generating means, the driving motors, and the control apparatus therefor.

It is an object of our invention to provide for the maximum energy input to the motors consistent with the energy output of the steam generating equipment when such maximum energy is desired. To that end a manually operated master controller is provided for controlling the connections of the driving motors with the electric generating means and also automatic devices for limiting the energy input to the motors so that for maximum acceleration of the locomotive, the manually operated controller might be moved immediately to its extreme position whereupon the connections of the motors are controlled automatically so as to utilize the maximum amount of energy that can be generated by the steam equipment.

The driving motors are controlled by controlling their connections in series or parallel with each other and also by controlling the voltage of the electric generating means. This voltage is controlled by varying the field excitation current supplied to a metadyne exciter which, in turn, supplies exciting current for the electric generating means.

A resistor is also provided for dynamically braking the motors. It is preferably of the type described and claimed in a copending application Serial No. 347,048, filed by John F. Tritle and Charles A. Petersen on July 23, 1940, for Resistor, assigned to the same assignee as this invention. This resistor is tubular in form so that cooling water may be circulated through it and it is arranged in two parallel paths for the circulation of cooling water at least portions of the resistor in each path being connected in series with each other electrically for connection to the motors during dynamic braking.

The dynamic braking is furthermore coordinated with the air brake system on the cars drawn by the locomotive so that the dynamic braking is applied automatically upon application of the air brakes on the cars. The dynamic braking can also be controlled manually for holding a train on a grade when the air brakes are not applied. The connections between the braking resistor and the motors are controlled by the pressure of the cooling water supplied to the resistor and the pressure of steam generated in the resistor so that in the event of failure of the cooling water supply or excessive steam pressure in the resistor, the resistor is disconnected from the motors, as described and claimed in a copending application Serial No. 288,327, filed by John F. Tritle, Jacob W. McNairy and Charles A. Petersen on August 4, 1939, for Vehicle drive system, assigned to the same assignee as this invention.

Figure 3:
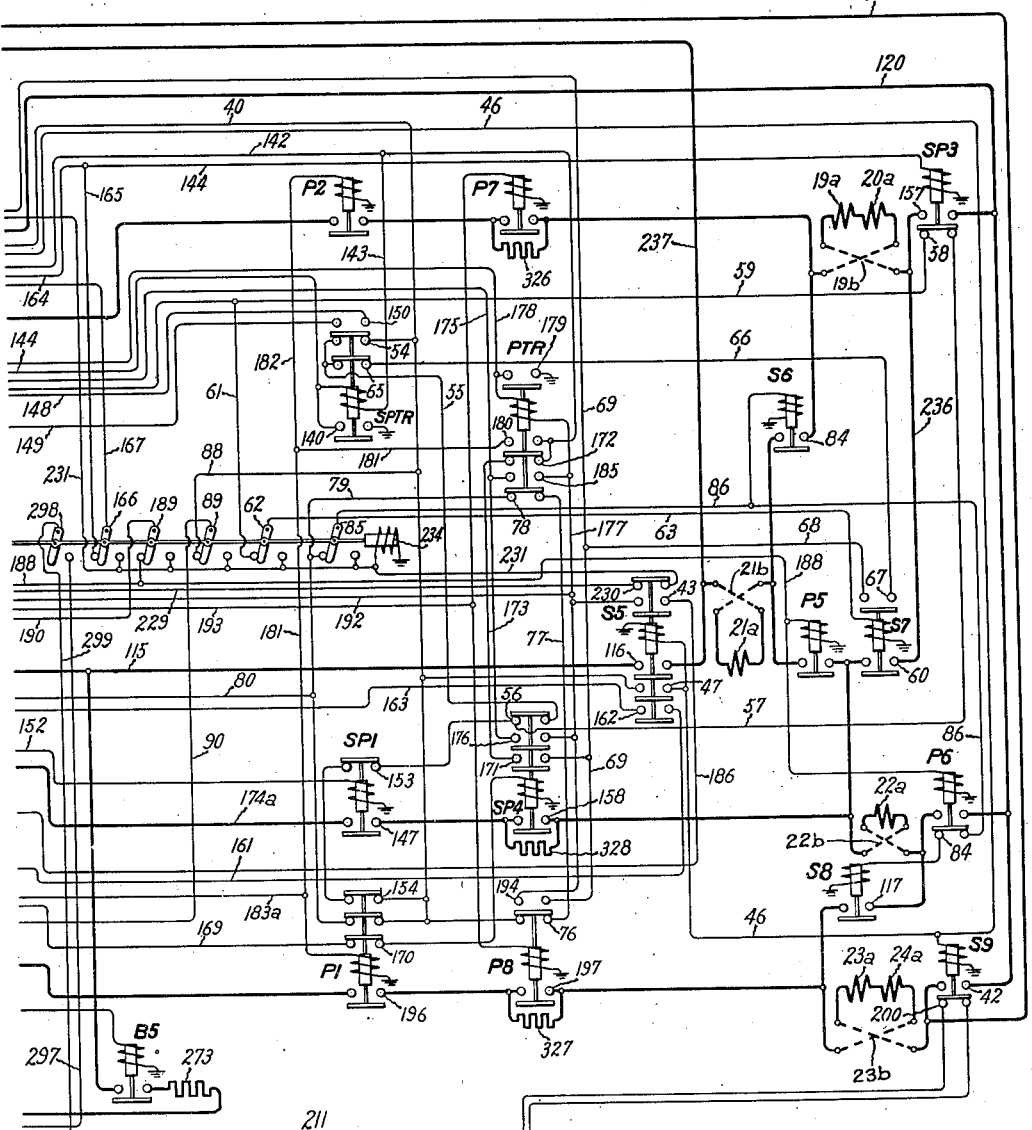
Figure 7:
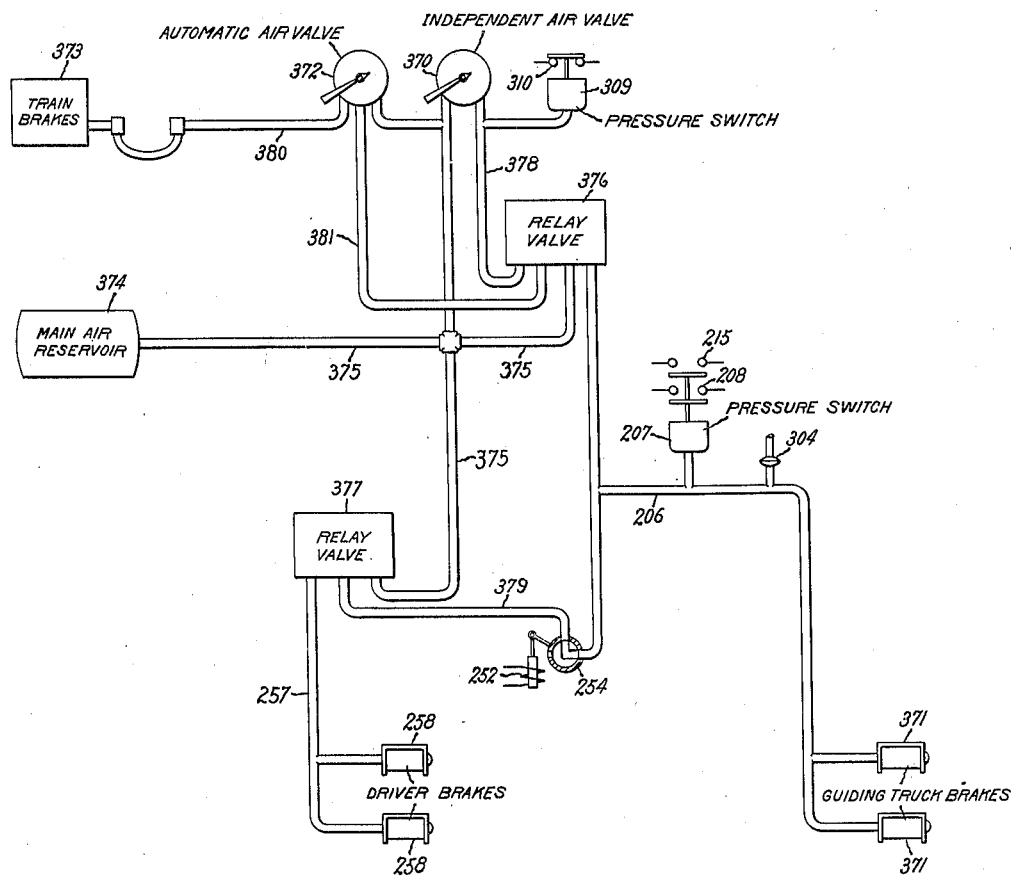

For a more complete understanding of this invention, reference should be had to the accompanying drawings in which Figs. 1, 2, and 3 are partial drawings of a turboelectric drive system embodying this invention, these three figures being arranged to be fitted together side by side in the order mentioned; Fig. 4 is a diagrammatic view of the braking resistor and the electrical and cooling water connections therefor; Fig. 5 is a chart showing the sequence of energization of the relays and contactors, certain switches of which are closed upon energization while others are opened, Fig. 6 is a fragmentary diagrammatic view showing a modified form of our invention, while Fig. 7 is a diagrammatic view showing an air brake system for the locomotive and cars drawn by it, together with the control devices operated by air pressure and the electric braking responsive control for the locomotive air brakes.

In one form of the invention, two electric generators 10 and 11 (top Fig. 2) are provided, these generators being driven at a constant speed by a steam turbine 12 supplied with steam from a boiler 13. Preferably, the turbine 12 is a high-speed type operating at, for example, 12,500 r. p. m. and is supplied with steam at a very high pressure from the boiler 13, such as 1500 lbs. per square inch. Suitable speed reducing gearing (not shown) is provided between the turbine 12 and is supplied with steam at a very high pressure hausts into a condenser 12a. As shown, the two generators 10 and 11 are connected in series with each other, the voltage of each generator being 700, thus making a 1400 voltage circuit for the driving motors. A midpoint between the two generators is connected to ground at 14 on the vehicle or locomotive frame and, consequently, one generator gives 700 volts above the ground potential while the other gives 700 volts below the ground potential.

Excitation is supplied to the separately excited generator field windings 15 and 16 by a metadyne exciter 17 (top Fig. 2) such as described and claimed in U. S. Patent to Pestarini No. 2,094,492, issued September 28, 1937. This exciter has an advantage that it acts as a direct current transformer, the current supplied by it to the field windings being always in a given ratio to the current supplied to the field winding 18 of the exciter.

The generators 10 and 11 supply current to six motors 19 to 24 (center Fig. 2) inclusive. Acceleration of the motors is effected entirely by controlling the excitation of the field winding 18 of the exciter. The motors may also be disconnected from the generators and connected through a resistor 25 (bottom Fig. 2) for dynamic braking, the motor fields, in this case, being supplied with current from the exciter. The generators are shunt field direct current generators and the motors are series field direct current motors. The generator shunt fields 15 and 16 are arranged to be excited with a current of high value, comparable in value to the current in the motor series field windings during motor operation. Commutating fields 10a and 11a are provided for the generators.

In starting, the six motors are connected in series with each other. After acceleration proceeds, the connections are changed to divide the motors into two groups of three each, connected in series, these two groups being connected in parallel with each other. Finally for the high-speed connection, the motors are divided into three groups of two each, connected in series with each other, these three groups being connected in parallel with one another. During dynamic braking, the latter parallel connection, i. e., three groups of two each in series in parallel is used.

For controlling the motors, three hand-operated rotary controllers are provided, a master or acceleration controller 26 (left top Fig. 1), a braking controller 27 (left center Fig. 1) and a reversing controller 28 (top center Fig. 1), all three being shown diagrammatically are of the cam operated contact type. These three controllers are operated by separate handles (not shown) and the braking controller 27 is also operated automatically by air pressure. The accelerating controller 26 and the braking controller 27 are furthermore mechanically interlocked with each other by a mechanism (not shown) so that the braking controller cannot be moved to an operating position so long as the acceleration controller is in a running position. In other words, the acceleration controller must be returned to its off-position before the braking controller can be moved to an operating position.

During the acceleration period, the motors are controlled automatically by a current limit relay CLR (center Fig. 1) and a kilowatt limit relay KWR (center Fig. 1) so as to hold the current and kilowatt input to the motors below a predetermined maximum within the power capacity of the turbine 12, generators 10 and 11, and boiler 13. The relays CLR and KWR are shown as being of the multiple contact, floating coil, type such as described and claimed in the McNairy Patent 2,064,621, issued December 15, 1936.

During the dynamic braking operation, the progress of the braking controller 27 is controlled by a current limit relay CLB (lower center Fig. 1) and a kilowatt limit relay KWB (lower center Fig. 1).

*Brief synopsis of operation*

Assuming that the turbine is in operation and driving the generators at their predetermined normal speed, to start the locomotive the reversing controller 28 is first thrown to a forward or reverse position and furthermore turned in that position to the desired limiting condition of operation of the motors, i. e., series, series parallel or parallel. Then the acceleration controller 26 is turned to connect the generators to the motors for starting of the locomotive. As the controller 26 is advanced, resistance is cut out of the field circuit of the generator exciter 17 so as to increase the generator voltage for acceleration.

During acceleration the motor current is limited by the CLR relay and the motor kilowatts are limited by the KWR relay so as to limit the power input to the motors to a predetermined maximum within the capacity of the turbine, regardless of the position of the controller 26. The KWR relay, however, is disabled until after the resistance has been cut out of the field winding of the exciter at which time the generator voltage is at a maximum. This operation of the KWR relay begins when the controller 26 reaches its 15th position. Also from the 15th position to the 21st or last position the setting of the KWR relay is changed gradually to permit an increased kilowatt input to the motors.

During acceleration, the transfer of the motor connections from series to series parallel and to parallel is brought about automatically by a relay VI (upper left Fig. 2) which is responsive to the generator voltage. When the voltage reaches a predetermined value, which may occur during the first few positions of the controller 26 if the controller is moved slowly, the motor connections are changed to the series parallel and when the generator voltage again reaches a maximum, the connections are changed to parallel. This assumes that the reversing controller 28 was moved to the parallel position. If it is left in the series parallel position, series parallel connections only are established and if it is left in the series position, the series connections are maintained.

The CLR and KWR relays are furthermore changed to reduce the energy input to the motors in response to a drop in steam pressure whereby the turbine is relieved of load.

The locomotive may be decelerated by simply turning the reversing controller 28 back to the series parallel or series position as desired, the master controller 26 being left in its last or 21st position. This causes the motor connections to be automatically changed in reverse order to their change during acceleration.

For dynamic braking of the locomotive, the controller 26 must be turned to its off position. Then the braking controller 27 is turned to connect the braking resistor to the motors for dynamic braking. The controller 27 can be turned manually, but if the air brakes are applied on the cars of the train, the braking controller is turned automatically. When dynamic braking is established on the locomotive, the locomotive air brakes, if applied, are automatically released.

During dynamic braking, cooling water is caused automatically to flow through the braking resistor. The dynamic braking energy input is automatically limited to a predetermined maximum by a current limit braking relay CLB (center Fig. 1) and a kilowatt limit braking relay KWB (center Fig. 1), these relays controlling a ratchet mechanism which in turn controls the advance of the braking controller 27.

Dynamic braking is continued until the voltage across the braking resistor drops to a predetermined minimum corresponding to a low track speed such as 10 or 12 miles per hour, at which time dynamic braking is automatically discontinued (relay V3, right center Fig. 1). Air brakes may then be applied to the locomotive to bring the train to a stop. As the train air brake pressure is reduced, the setting of the braking kilowatt relay KWB is lowered to correspondingly reduce the dynamic braking. During dynamic braking, the generators are connected to energize the field windings of the motors.

*Acceleration*

Assuming that the generators are being operated at the desired speed by the turbine, the motors are started by first throwing the reversing controller 28 (top Fig. 1) to the final limiting operating position desired in either the forward or the reverse direction, i. e., the series position S, the series parallel position SP or the parallel position P. Thereafter the master controller 26 (left top Fig. 1) is moved to a running position. If desired, the master controller 26 can be turned as fast as possible without causing the drivers to slip to a desired final position in which case the motors will be accelerated automatically at the maximum rate permitted by the CLR and KWR (bottom center Fig. 1) relays to a speed determined by the position of the controller 28.

It will be assumed that the reversing controller 28 has been moved to the high-speed parallel position P in the forward direction and that the acceleration controller 26 is moved slowly from one position to the next.

With the acceleration controller in its first position, the motor field reversing switch coil 33 (top Fig. 1 and top Fig. 3) is energized, which coil operates the reversing switches 19b (top right Fig. 3), 21b, 22b and 23b (right Fig. 3) for the motor fields 19a to 24a (right Fig. 3) to connect the fields for forward rotation of the motors. For reverse operation the coil 33a (top Fig. 1) is energized to throw the switches 19b, 21b, 22b and 23b to their reversed positions. The circuit for the coil 33 is from a positive supply source 34 (top Fig. 1) which may be a storage battery or a small auxiliary direct current generator with negative grounded, through conductor 35, switch 36 on the controller 26, conductor 37, the reversing switch, conductor 38 and coil 33 to ground. The coil 33 also closes an interlock switch 39 (top center Fig. 1) which connects the supply source 34 through the circuit already traced to the conductor 40. From conductor 40 energy is supplied to close the following control switches, the controller 26 being in its first position. To facilitate identification, the operating means of various relays and switches have been given reference letters, reference numerals being given the contacts.

Switch 41 (right center Fig. 1) closes; control circuit from the conductor 40 through its operating coil to ground.

S9 (lower right Fig. 3) switch 42, and S5 (center Fig. 3) switch 116 close; control circuit, closed by switch 41, leads from conductor 40 through switch 44 on controller 26, conductor 45, switch 41, conductor 46 and S5 and S9 coils to ground.

It will be noted that the S5 switch 47 closes a circuit from the conductor 40 to the coils so that the master controller 26 may be turned to next position, opening its switch 44, without deenergizing the S5 and S9 coils.

GF1 switch 48 (top center Fig. 2) and GF2 switch 49 (top center Fig. 2) close; control circuit is from conductor 40 through EFM switch 50 (top right Fig. 1) which is now closed, conductor 51, B1 switch 52 (top right Fig. 2) which is closed and the GF1 and GF2 coils to ground.

S3 switch 53 (center Fig. 2) closes; the control circuit is from conductor 40 through SPTR switch 54 (left center Fig. 3), conductor 55, SP4 switch 56 (lower center Fig. 3), conductor 57, SP3 switch 58 (top right Fig. 3), conductor 59 and the S3 coil to ground.

S7 switch 60 (right center Fig. 3) closes; circuit from conductor 59 through conductor 61, switch 62, conductor 63 and the S7 coil to ground.

EFM switch 64 (right top Fig. 1) and 91 closes; control circuit from conductor 40 through SPTR switch 54 (center Fig. 3), SPTR switch 65, conductor 66, S7 switch 67 which is now closed, conductor 68, conductor 69, GF1 switch 70 (top Fig. 2) which is now closed, conductor 71 and EFM coil (right top Fig. 1) to ground. At the same time that switch 64 is closed, the switch 50 operated with it is opened. The switch 50 is in circuit with the GF1 and GF2 coils but the switch 64 connects these coils directly to the supply source 34 through the conductor 72.

S2 switch 75 (lower center Fig. 2) and S4 switch 74 (center Fig. 2) close; control circuit from the conductor 40 (top Fig. 3) through P3 switch 76 (lower center Fig. 3), conductor 77, PTR switch 78 (center Fig. 3), conductor 79, conductor 80, P3 switch 81 (left center Fig. 2), conductor 82 and the S2 coil (lower center Fig. 2) to ground and from conductor 80 through conductor 83 and the S4 coil (center Fig. 2) to ground.

S6 switch 84 (right center Fig. 3) and S8 switch 117 (lower right Fig. 3) close; control circuit from conductor 80 through switch 85, conductor 86 and the S6 coil to ground, and from conductor 86 through P6 switch 84 (lower right Fig. 3) and S8 coil to ground.

S1 switch 87 (lower left Fig. 2) closes; control circuit from conductor 40 through conductor 88, switch 89, conductor 90 and the S1 coil to ground.

Exciter field 18 (right top Fig. 2), energized by closure of EFM switch 91 (right center Fig. 1) simultaneously with the closure of switch 64, the circuit being from conductor 35 through conductor 92, switch 93 on the controller 26, resistance 94, conductor 95, resistance 96, the shunt contacts 97 and 98 of the KWR and CLR relays (center Fig. 1), conductor 99, switch 100, conductor 101, normally closed switch 102 (center Fig. 1) on the braking controller 27, the lower portion of resistor 103 (center Fig. 1), conductor 104, switch 91 and conductor 105 through the field winding 18 contact 324a (right center Fig. 2) to ground.

It should be noted at this time that the movable shunts 97 and 98 normally short circuit the resistances 97a and 98a (top center Fig. 1) but are automatically operated as will be hereinafter described to insert sections of the resistances in the circuit of the field winding 18 so as to control its energization.

The generators 10 and 11 are now connected in a closed circuit with the motors, this circuit leading from generator 10 (top Fig. 2) through the normally closed GS switch 106, conductor 111, S1 switch 87 (lower left Fig. 2) which is now closed, motors 23 and 24 (lower Fig. 2), conductor 112, S2 switch 75 which is now closed, conductor 113, motor 21 (center Fig. 2), conductor 114, S3 switch 53 now closed, motor 19, motor 20 (center Fig. 2), S4 switch 74 which is closed, motor 22, conductor 115, S5 switch 116 (right center Fig. 3) now closed, field 21a, S6 switch 84 now closed, fields 19a and 20a, S7 switch 60 (right center Fig. 3) which is closed, field 22a, S8 switch 117 (lower right Fig. 3), now closed, fields 23a and 24a, S9 switch 42 (lower right Fig. 3) which is closed, conductor 120, generator 11 (top Fig. 2), series field 11a of generator 11 and series field 10a of generator 10 back to the other side of generator 10. Thus the motors with their fields are connected in series relation across the two generators.

At this time, the field winding 18 is supplied with minimum excitation because of the resistances 94, 96, included in its circuit and, therefore, the generators apply a low voltage to the motors for gradual starting.

Also a switch 121 (left center Fig. 1) on the master controller 26 is closed and closes a circuit from the point 122 on the resistor 96 (top center Fig. 1) through a switch 123 (center Fig. 1) and a resistor 124 to ground. This resistance 124 has a resistance equal to the resistance of the field winding 18 and this connection is provided to permit multiple operation of two locomotives or vehicles. When the manually operated switch 123 is closed for single locomotive operation, the circuit through the resistor 124 to ground serves no useful purpose. For multiple operation, the switch 123 is opened and the field winding of the exciter on the other locomotive is connected to ground in place of the resistance 124 as by a jumper connection 125 (top center Fig. 1). This connects the second field winding in parallel with the field winding 18 and the two field windings connected in parallel with each other are then controlled by the controller 26. Each individual field winding, however, is automatically controlled by its own current limit and kilowatt limit relays CLR and KWR (center Fig. 1).

For continued acceleration of the motors and of the vehicle, the controller 26 is advanced to first short circuit the resistance 94 (center Fig. 1) over the steps 2 to 9 inclusive whereby the excitation of the field winding 18 is increased and the exciter 17 (top Fig. 2) caused to correspondingly increase the excitation of the generator field windings 15 and 16 for increased voltage supplied to the motors.

The operator may turn the master controller 26 at such speed as to demand a generator current to exceed a predetermined maximum value such as 3200 amperes as indicated on the meter 126 (top Fig. 2) in the generator circuit. In that event, the relay CLR operates to insert sections of its resistance 96a (center Fig. 1) in case the 3200 value is exceeded, thus reducing the excitation of the field winding 18 and reducing the current to the 3200 ampere value.

It will be noted that the movable or floating coils 127 and 128 of the relays CLR and KWR are connected in parallel with each other and across a shunt conductor 129 (top center Fig. 2) in the generator circuit whereby the coils are energized in response to the generator current. The CLR relay is provided also with a stationary voltage coil 130 (center Fig. 1) which is connected for constant energization from conductor 40 through conductor 131, a regulating resistance 132 and the coil 130 to ground. The KWR relay also has a voltage coil 133 but this coil is not energized at this time and for that reason the KWR relay is disabled up to the 15th position of the controller 26 when the coil 133 is energized. The movable coils 127 and 128 of these relays are arranged to move downward in response to increases in their current. These coils each carry an elongated bridging contact, indicated diagrammatically in the drawing, as will be understood from the description in the aforesaid McNairy Patent 2,064,621.

As described in the aforesaid McNairy patent, the CLR and KWR relays have a number of spring contact fingers, one or more of which press on the movable contact bar carried by the movable winding in dependence upon the position of the bar. It has been found that the spring force supplied by the contact fingers has the effect of changing the calibration of the devices. Therefore these two relays are provided with compensating coils 130a and 133a to correct for this effect. These two coils also introduce a correction for the effect of the extra flux set up by the current in the floating coils. On the CLR relay, the compensating coil 130a is energized to act cumulatively with respect to the coil 130 directly from the armature of the generator 10 through the two conductors 130b and 130c. Since the generator voltage varies inversely with the generator current, the energization of the coil 130a varies in like manner. On the KWR relay, the coil 133a is connected in parallel with the floating coil 128 and is energized in a direction to oppose the fixed coil 133.

From the 10th to the 16th positions of the controller 26 the resistance 96 (top center Fig. 1) is cut out in steps to still further increase the excitation of the field winding 18 and still further accelerate the motors.

On the 15th position of the controller 26, the lower-most switch 134 (left center Fig. 1) is closed thereby closing its circuit connecting the voltage coil 133 of KWR relay across the generator 10. This circuit leads from point 135 (top left Fig. 2) on the high side of the generator 10, conductor 136, coil 133 and switch 134 to ground. The relay KWR now limits the kilowatt input to a predetermined value by suitably controlling the tap circuits for its resistance 97a. From the 15th position to the 21st or last position, the setting of the relay KWR is gradually increased by gradually inserting sections of a resistance 137 (left center Fig. 1) in series with the coil 133, this being effected by gradual sequential closure of the five switches on the controller 26 above the bottom switch 134 as will be obvious from the drawing. As a result, the relay KWR raises the kilowatt limit as the controller 26 is advanced from the 15th position.

*Acceleration, transfer of motor connections from series to series parallel*

The transfer of the motor connections takes place automatically and without the knowledge of the operator. In the event of light load or down grade, the motors may be connected and probably will be connected in parallel by the time the controller 26 has been turned by the operator over a few positions. If, however, the operator turns the controller 26 fast enough to maintain the predetermined current value such as 3200 amperes by observing the meter 126, the series connection will be maintained up to the 15th position when the relay KWR begins to function to limit kilowatts with the result that as the motors further accelerate, the current decreases.

This transfer of the motor connections is taken care of by a transition relay VI (left top Fig. 2) having an operating coil connected across the generator 10 so as to be responsive to the voltage of the generator. This connection is from the conductor 136 through the resistor 139, the VI coil and to the other side of the generator 10. When the generator voltage becomes high enough to pick up this relay VI its switch closes a circuit for the SPTR coil (left center Fig. 3) to close the switches 140 and 150 which switches when closed cause a rapid sequential closing of certain switches through six steps as indicated on the sequencing chart to bring about the series parallel connection.

During this automatic change of the motor connections, the EFM switch 91 (top left Fig. 1) opens and opens the circuit of the field winding 18 to assure a decrease in the voltages of the generators and thus lighten the duty of the switches. It should be noted that to prevent excessive voltages on the exciter 17, the armature circuit of the exciter is always closed before the circuit of the field winding 18 is closed and in stopping the motors, the circuit of the field 18 must be opened before the armature circuit of the exciter 17 is opened.

By reason of the reduced voltage of the generator 10 during sequencing, the VI relay (left top Fig. 2) opens during this sequencing. The series parallel connections are maintained until the voltage of the generator 10 is again high enough to operate the relay VI. When this occurs, the sequencing steps to effect the parallel connection of the motors are automatically made.

The various circuits established during the sequencing transition from series to series parallel are as follows:

SPTR switches 149 and 150 (center Fig. 3) close; control circuit leads from conductor 40 (top Fig. 1) through the second from bottom segment of reversing switch 28, conductor 141, conductor 142, conductor 143, the coil of the SPTR relay, conductor 144 SP2 switch 145 (left center Fig. 2) which is closed, conductor 146 and switch VI to ground. When the SPTR switch 140 closes, the SPTR switches 54 and 65 open, thereby opening the circuit of the EFM coil (top right Fig. 1) whereupon switch 91 opens to open the circuit of field winding 18.

SP1 switch 147 (left center Fig. 3) closes; control circuit leads from the conductor 83 (center Fig. 2) through the conductor 148, SPTR switch 150 which also is closed with switch 140, conductor 149, switch 151 (lower left Fig. 2) which is closed, conductor 152 and the SP1 coil to ground.

The SP1 switch 147 in closing opens its interlock switch 153 which is in the circuit of the S3 and S7 operating coils whereby the S3 (center Fig. 2) and S7 (right center Fig. 3) switches 53, 60 and 67 drop open. It should be noted here that the operation of the SPTR relay (left center Fig. 3) opened the interlock switch 54 and thereby transferred the circuit of the S3 and S7 coils to the SP1 switch 153, a circuit leading from the conductor 40 through the switch 154 and switch 153 to the conductor 57 and thence as previously described. The S3 switch 53 in opening, closes an interlock switch 155 which closes circuits for the coils of switches SP2 (left center Fig. 2), SP3 (right top Fig. 3) and SP4 (lower center Fig. 3) whereby the motor circuit switches 156, 157 and 158 are closed. The circuits are as follows:

SP2 switch 156 closes; circuit from conductor 141 (left center Fig. 2) through conductor 159, S1 switch 160 which is closed, conductor 161, S5 switch 162 (center Fig. 3) which is closed, conductor 163, S3 switch 155 (center Fig. 2), conductor 164, conductor 165, switch 166 (left center Fig. 3), conductor 167 and the SP2 coil to ground.

SP3 switch 157 (right top Fig. 3) closes; coil circuit leads from conductor 164 through the coil to ground.

SP4 switch 158 (lower center Fig. 3) closes; coil circuit from conductor 141 (left center Fig. 2) through SP2 switch 168, conductor 169, P1 switch 170 (lower center Fig. 3) which is closed and the SP4 coil to ground.

EFM switch 64 (upper right Fig. 1) closes; coil circuit is closed by the SP4 switch 171 (lower center Fig. 3) which is closed with the switch 158. The coil circuit leads from conductor 142 (upper center Fig. 2) through PTR switch 172 (center Fig. 3), conductor 173, SP4 switch 171 to conductor 69 and thence through the GF1 switch 70 (top Fig. 2), conductor 71, and the EFM coil of switch 91 to ground. It will be observed that when the EFM switch 50 opened, the EFM switch closed, thereby maintaining closed the field switches GF1 and GF2 and also the switch 70. Thus, the opening of switch 50 and the closing of switch 64 simply transfers the control of the switches GF1 and GF2 from switch 50 to switch 64. At the same time, the EFM switch 91 is closed thus reclosing the circuit of the field winding 18 (right top Fig. 2).

The motors are now connected in series parallel, the connections leading from generator 10 (top Fig. 2) through conductor 111, conductor 174, SP2 switch 156, motor 19, motor 20, S4 switch 74 (center Fig. 2), motor 22, conductor 115, S5 switch 116 (center Fig. 3), field 21a, S6 switch 84 (right center Fig. 3), fields 19a and 20a, SP3 switch 157 and by way of conductor 120 to the generator 11.

A parallel motor circuit leads from conductor 111 through S1 switch 87 (lower left Fig. 2), motor 23, motor 24, conductor 112, S2 switch 75, conductor 113, motor 21, conductor 114, conductor 174a, SP1 switch 147, SP4 switch 158 (center Fig. 3), field 22a S8 switch 117, fields 23a and 24a, S9 switch 42 to the conductor 120.

*Acceleration, transfer of motor connections from series parallel to parallel*

When the series parallel connections are made, the motors take more current with consequent drop in the generator voltages, and the VI relay (top center Fig. 2) drops open. Upon further acceleration of the motors when the voltage again increases to the predetermined transition value, the VI relay again closes and brings about the parallel connection of the motors through the sequence of steps indicated on the chart (Fig. 5) as follows:

PTR relay (center Fig. 3) energized; circuit from conductor 40 through lower forward segment of reversing switch 28 (top Fig. 1), conductor 175, SP4 switch 176 (center Fig. 3), conductor 177, coil of PTR, conductor 178 and V1 switch to ground. Simultaneously, the PTR switch 179 (center Fig. 3) closes a sealing circuit to ground for the PTR coil independently of the V1 switch, this circuit leading directly from the conductor 178 through switch 179 to ground. The opening of the PTR switch 172 deenergizes the EFM coil (upper right Fig. 1) so that the EFM switch 91 opens the circuit of the field winding 18.

P1 (lower center Fig. 3) and P2 (upper center Fig. 3) switch coils energized; circuit from conductor 142 through PTR switch 180 (center Fig. 3), conductor 181 and the coil of P1 to ground and from conductor 181 through conductor 182 and coil P2 to ground.

S2 (lower center Fig. 2), S4 (center Fig. 2), S6 (right center Fig. 3) and S8 (lower right Fig. 3) switch coils deenergized; by opening of the PTR switch 78 (center Fig. 3) so that S2 switch 75, S4 switch 74, S6 and S8 open. The closing of S2 switch 183 establishes a circuit for the P1 and P2 coils (center Fig. 3) from conductor 159 through S1 switch 182a (lower left Fig. 2), S2 switch 183 conductor 183a and the coils to ground.

SP1 and SP4 (center Fig. 3) switch coils deenergized; by opening of P1 switch 170 (bottom Fig. 3) so that the SP1 switch 147 and the SP4 switch 158 open.

P3, P4 (bottom center Fig. 2), P5 and P6 (right center Fig. 3) switch coils energized; circuit closed by S2 switch 187 (center Fig. 2) and S4 switch 184 (center Fig. 2) leads from conductor 175 through PTR switch 185 (center Fig. 3), conductor 177, S5 switch 43 (center Fig. 3), conductor 186, S2 switch 187 (lower center Fig. 2), S4 switch 184 (center Fig. 2), conductor 188 and the coils of P5 and P6 to ground and from conductor 188 through switch 189 (left center Fig. 3), conductor 190 and the P3 and P4 coils to ground.

P7 (top center Fig. 3) and P8 (bottom center Fig. 3) coils energized; by closing of P3 switch 191, circuit from conductor 177 (center Fig. 3) through conductor 192, P3 switch 191, conductor 193 and the P7 and P8 coils to ground.

EFM switch coil energized; by closing of P8 switch 194 (lower center Fig. 3) circuit from conductor 177 (center Fig. 3), through P8 switch 194 to conductor 69 and thence as before.

The parallel connections of the motors are now as follows:

From conductor 111 (top Fig. 3) through conductor 174, SP2 switch 156 (left center Fig. 2), motor 19, motor 20, the P2 switch (top Fig. 3), P7 switch, field windings 19a and 20a and SP3 switch 157 to conductor 120. The second parallel circuit is from conductor 111 through P3 switch 195, motor 21, P4 switch, motor 22, conductor 115, S5 switch 116, field winding 21a, P5 switch, field winding 22a and the P6 switch to conductor 120. The third parallel circuit is from conductor 111 through S1 switch 87, motor 23, motor 24, P1 switch 196, P8 switch 197, field windings 23a and 24a and the S9 switch 42 to conductor 120.

*Steam pressure load limit*

During motoring operation diaphragm devices 198, 198a (center Fig. 1) responsive to the steam pressure in the boiler 13, act on the contact mechanisms of the KWR and CLR relays through the means of the spring pressed levers 199 and 199a. The steam devices 198 and 198a are operated by steam pressure so that with full boiler pressure the levers 199 and 199a do not interfere with the operation of the relays. However, when the steam pressure drops, the levers 199 and 199a are pushed by their springs on the contact mechanisms of the relays, insert portions of resistances 97a and 98a, and thereby decrease the excitation of the field 18 and hence the voltage of the generators and load supplied to the motors.

This relieves the boiler of excessive load as indicated by a drop in steam pressure which might be caused by faulty boiler tubes, faulty condenser operation, etc.

*Deceleration by reversing controller 28*

The locomotive may be decelerated by turning the reversing controller 28 (top Fig. 1) back to the series parallel "SP" position or the series "S" position. The master control 26, if desired, being left in the last or 21 position. As indicated on the sequence chart, the connections for the motors are changed in substantially reverse order with respect to the changes in connections during acceleration.

To change from parallel to series parallel, the reversing controller 28 is moved back to the SP position. This interrupts the circuit for the control voltage leading from conductor 40 (top Fig. 1) through the lowermost switch of the reversing controller to the conductor 175 whereby the PTR relay (center Fig. 3) is deenergized. The PTR switch 185 opens the circuits of the P3, P4 (center Fig. 2), P5 and P6 (right bottom Fig. 3) coils and the consequent opening of the P3 switch 191 opens the circuits of the P7 and P8 (Fig. 3) coils. Also the PTR switch 180 opens the coil of the P1 and P2 coils (Fig. 3). The P1 switch 170 closes and establishes the circuit of the SP4 coil (center Fig. 3) which closes its switch 158. The series parallel connections are now established.

For the series connections, the reversing controller 28 is returned to the S position. This opens the control circuit through the second switch from the bottom to the conductor 141, thereby deenergizing the coils of SP2 (right center Fig. 2), SP3 (right top Fig. 3) and SP4 (center Fig. 3) whereby the SP2 switch 156, the SP3 switch 157 and the SP4 switch 158 all open. The SP4 switch 171 opens the circuit of the EFM coil (right top Fig. 1) whereby the EFM switch 64 opens. Also the SPTR coil (center Fig. 3), energized through conductor 141 is deenergized and the SPTR switch 148 opens. The SPTR switch 54 closes the circuit of the S3 coil (center Fig. 2) whereby the S3 switch 53 closes and the SPTR switch 54 closes the circuit of the S7 coil (right center Fig. 3) which closes its switch 60. This establishes the series connections.

*Braking control*

It is contemplated that the cars drawn by the locomotive will be supplied by air brakes which are controlled from the locomotive in a conventional manner. This braking system (not shown) is entirely separated from the electric system. The motorman will throw the controller 26 to its off position ordinarily before applying the air car brakes.

Before dynamic braking of the locomotive by means of the driving motors can be applied, however, the controller 26 must be turned to its off position to thereby deenergize and open the S9 switch 42 (right bottom Fig. 3) and at the same time, close the S9 interlock switch 200.

The braking controller 27 (right center Fig. 1) is driven by a shaft 201 which is connected for operation either manually by means of a handle 202 (left bottom Fig. 1) or automatically in response to the air pressure applied to the air brakes through the means of an air cylinder 203. The handle 202 and the air cylinder 203 are connected to the braking controller shaft 201 through spring mechanism 204 and the rate of movement of the controller is regulated in response to the dynamic braking current by ratchet mechanism 205 both of which are described and claimed in the Tritle and McNairy Patent 2,114,-196, dated April 12, 1938, filed August 17, 1937. Ordinarily the braking controller 27 will be operated automatically in response to the application of air pressure to the air brakes on the train and, consequently, this operation will be described first. When it is desired to hold a train coming down a grade with no train air brakes, the braking controller must be operated manually by means of the handle 202.

When air pressure is applied to the train air brakes, air pressure is applied to a pipe 206 (lower left, Fig. 1) which is connected to a brake control cylinder 207. The air brake system is described hereinafter more completely in connection with Fig. 7. When pressure is applied to the control cylinder 207, the pressure of the air moves the piston of the control cylinder downward as seen in Fig. 1 to close a relay switch 208 in circuit with a braking controller operating coil 209. This circuit leads from the supply conductor 35 through a switch 210 on the controller 26 (top Fig. 1) which is closed when the control is in its off position to conductor 211, S9 switch 200 (right bottom Fig. 3), conductor 212, switch 208 (lower left Fig. 1), switch 310 and the coil 209 to ground. The coil 209 opens an air valve 213 and a coil 214 energized from the conductor 212 through the switch 215, turns the three-way valve 216 to a position to admit air from a 70 lb. air supply pipe 216a through valve 216 and valve 213 to the cylinder 203. The piston of the cylinder 203 now moves downward and turns the shaft 217 in a counterclockwise direction as seen from the left-hand margin of the drawing, thereby tensioning the helical spring 218, one end of which is secured to the shaft 217 and the other end to a gear sector 219, thus applying a turning torque through the gearing 220 and 221 to the braking controller shaft 201. This force tends to turn the ratchet wheel 222 in the direction of the arrow, thus turning the pawl 223 about its pivot 224 sufficiently to close the contacts 225.

This initial movement of the braking controller before it is stopped by the pawl 223 is sufficient to move the braking controller to its first position whereby a dynamic braking circuit is established, with the following switches closed as indicated on the sequence chart.

Switches B1 and B2 (upper right Fig. 2) close; circuit from conductor 211 through switch 226 on the braking controller conductor 227, EFB switch 228 (upper right Fig. 1), conductor 229, S5 switch 230 (center Fig. 3), conductor 231, GF1 switch 232 (top Fig. 2), and the coils of B1 and B2 to ground. This establishes the armature circuit of the exciter 17 for the motor fields.

GS switch 106 (upper left Fig. 2) opens; circuit from conductor 229 through the GS coil to ground.

Also the coil 234 (center Fig. 3) is energized directly from the conductor 231 which operates to throw the switches 62, 85, 89, 166, and 189 to their opposite closed positions and likewise, operates five single pole switches shown on the drawing.

S6 switch (right center Fig. 3) closes; circuit from conductor 231 through switch 85 (center Fig. 3), conductor 86 and the S6 coil to ground.

S8 switch closes (lower right Fig. 3); circuit from conductor 86 through P6 switch 84 (lower right Fig. 3) and S8 coil to ground.

S7 switches close (right center Fig. 3); circuit from conductor 231 through switch 62 (center Fig. 3), conductor 63 and the S7 coil to ground. The S6 switch, the S8 switch and the S7 switch 60 close the circuit connecting the motor field windings in series with each other across the exciter 17. This circuit leads from switch B2 through conductor 235, fields 23a, 24a (right Fig. 3), S8 switch 117 field winding 22a, S7 switch 60, conductor 236, field windings 20a, 19a, S6 switch 84, field winding 21a and conductor 237 back to the other side of the exciter through switch B1.

SP2 coil (left center Fig. 2) energized; circuit from conductor 231 through switch 166 (left center Fig. 3), conductor 167 and the SP2 coil to ground.

P3 and P4 coils energized; circuit from conductor 231, through switch 189 (left center Fig. 3), conductor 190 and the two coils to ground.

S1 coil energized; circuit from conductor 231 through switch 89 (left center Fig. 3), conductor 90 and the coil to ground.

CR4 switches 238 and 239 (right center Fig. 1) close; circuit from conductor 229 EFB switch 228 (right top Fig. 1), conductor 227 through the operating coil CR4 to ground.

EFB coil energized; circuit from conductor 211, braking controller switch 240, conductor 241, CR4 switch 238, conductor 242, switch 243 (center Fig. 2), switch 244, both normally closed, switch 245 which is maintained closed as will hereinafter be described, conductor 246, GS switch 247 now closed, conductor 248, B1 switch 249 (upper right Fig. 2), conductor 250 and the coil of EFB to ground. The closing of the EFB switch 259a transfers the control supply from conductor 227 to conductor 72 through switch 250a to conductor 229. EFB switch 250b closes a supply circuit for the exciter field winding 18 from conductor 194.

GS switch 106 (upper left Fig. 2) opens; its coil circuit leads from supply wire 72 through the upper EFB switch 250a and the coil to ground.

B3, B4 (lower right Fig. 2), B5 (lower left Fig. 3) and B9 (lower left Fig. 2) close; circuit from conductor 251 through the coils in parallel with each other to ground.

Also the air brakes on the locomotive driver wheels are automatically released at this time, the air brakes on the cars remaining applied. The locomotive air brakes are released by a coil 252 (lower left Fig. 1) energized through the conductor 253 and the conductor 253a (lower left Fig. 2) across a section 25a of the braking resistor. This coil 252 throws a two-way air valve 254 so as to connect an air operated valve 255 to exhaust so that the valve is then operated by a spring 256 to the position shown. In this position, the valve 255 shuts off the supply of air from the air brake supply pipe 257 to the locomotive driver wheel brake cylinders 258 only one of which is shown and connects the cylinders 258 to the exhaust pipe 259.

Braking resistor control

Also simultaneously with the establishment of these braking connections, cooling water is automatically supplied to the braking resistor 25. As shown diagrammatically in Fig. 4, this braking resistor consists of a plurality of tubes made of electrical resistor material such as stainless steel, the tubes being mechanically connected together to form two parallel paths 260 and 261 for the pressure flow of water therethrough although the two parallel paths are connected in series with each other in the electrical braking circuit. A circuit leads from the conductor 242 through switches 243 and 244 (center Fig. 2), conductor 244a and a coil 262 to ground (lower right Fig. 1 and Fig. 4). This coil 262 is energized at this time and opens a water valve 263 thereby providing for the flow of water at a conventional low pressure such as 75 lbs. per square inch through a check valve 264 to the two branches 260 and 261 of the resistor. A by-pass pipe 263a around the valve 263 provides for the flow of a small amount of water through the resistor when the valve 263 is closed to prevent freezing in cold weather.

The coil 262 also closes a switch 265 (lower right Fig. 1 and Fig. 4) to energize a coil 266. This coil opens a steam valve 267 to thereby supply steam from the boiler 13 at high pressure to the two water injectors 268 and 269 to assure that water is forced through the resistor circuits 260 and 261. It will be understood that for purposes of space economy, the resistor 25 is made as small as possible and heats in a very short interval, such as a few seconds, after the beginning of dynamic braking to a very high temperature. Consequently, steam is formed very rapidly in the resistor and a considerable back pressure is formed against the entrance of cooling water.

From the resistor 25 the steam generated in the cooling water goes to a separator 270 where the water in the steam is separated out and then to the steam condenser 12a. It is contemplated that distilled water will be used in the boiler 13 and also in the resistor and this water is completely recovered.

The resistor sections 260 and 261 are electrically insulated from the cooling water supply pipes connected therewith by the sections of pipe 260a and 261a made of electrically insulating material. Also an electrically insulated section of pipe 260b is provided for separating electrically the adjacent ends of the resistor sections 272 and 275.

Dynamic braking operation

The motors are now connected to the resistor 25 to operate as generators to brake the locomotive. The motors are connected two in series in three sets in parallel with each other across the resistor. One circuit leads from the resistor 25 through the B3 switch (lower right Fig. 2), conductor 111, switch S1, motors 23 and 24, the B3 switch (lower right Fig. 2) and resistor 272 to the other side of the resistor 25. A second circuit leads from the conductor 111 through the P3 switch 195, motor 21 switch P4 and motor 22, conductor 116 and the B5 switch (lower left Fig. 3) and resistor 273 while the third parallel circuit leads from conductor 111 through the SP2 switch 156, motors 19 and 20, conductor 274 and the B4 switch and resistor 275 both to the other side of the resistor 25. The resistors 272, 273 and 275 are provided in the respective parallel circuits for stabilization purposes. These resistances are of very low value.

A special current limit braking relay CLB (center Fig. 1) and a kilowatt limit braking relay KWB are provided. In this particular equipment being described, the dynamic braking is initiated with the maximum of 3600 kilowatts which is limited by the KWB relay, the current being limited to the maximum of 1400 amperes by the CLB relay. This control by the CLB and KWB relays is effected by controlling the rate of advance of the braking controller by the air motor 203 which is brought about by controlling the ratchet mechanism 205 (lower left Fig. 1).

The CLB and KWB relays are provided respectively with braking current responsive coils 276 and 277 which are connected in parallel with each other across the section 25a (lower left Fig. 2) of the braking resistor and are energized in response to the braking current. The KWB relay, which is similar in construction to the CLR and KWR (center Fig. 1) relays, has a voltage coil 278 connected through a B3 switch 279 (lower right Fig. 2), now closed, across the motor 21. In addition, these two relays have voltage coils 280 and 281 respectively which are energized from the conductor 211 through the switch 282 on the ratchet mechanism 205. Also the KWR relay has a compensating coil 277a, opposing the coil 278, which is connected in parallel with the coil 277.

The coils 283 and 284 of the ratchet mechanism are energized in series with each other from the conductor 212 through conductor 285, B1 interlock switch 286 (upper right Fig. 2), conductor 287 and the coils to ground. These coils are oppositely wound and have the same number of turns so that when they are energized, they neutralize each other.

The CLB and KWB relays control a short circuit for the coil 284 which, when closed, renders the coil 284 ineffective and the coil 283 thereupon picks up its armature 288 to advance the braking controller one notch. This short circuit for coil 284 is from the coil through conductor 289, switch 290 (right center Fig. 2), conductor 291, switch 292, held closed by a coil energized from the conductor 287, switch 293 normally closed and controlled by a voltage coil 294 in parallel with the coil 278, KWB switch 295, CLB switch 296, conductor 297, switch 298 (left center Fig. 3), conductor 299 and switch 225 on the ratchet mechanism to ground.

This short circuit for coil 284 may be opened upon the establishment of the dynamic braking by one or all of the switches 293, 295 and 296 by excessive voltage (switch 293) or current (switch 296) or KW (switch 295) and the controller is not advanced to its second position until all three switches have closed, when the voltage, kilowatts and current have each dropped to a value below a predetermined minimum value. The voltage switch 293 (lower right Fig. 1) assures a drop in voltage and speed to at least a predetermined value at which the current can be commutated before the advance of the braking controller.

When all three switches 293, 295 and 296 are closed, switch 292 being held closed, the coil 283 picks up its armature 288 and pulls the pawl 223 away from the ratchet 222, the switch 225 having been closed by the spring tension applied to the ratchet. The braking controller is now advanced by the spring 218 (lower left Fig. 1). At the same time, the armature 288 closes the switch 282 whereby the pick-up coils 280 and 281 on the CLB and KWB relays are energized and these relays pick up to open the short circuit around the coil 284. The armature 288 is then released and the pawl 223 pulled back to engage the next tooth of the ratchet 222, thereby stopping the braking controller in its second position. At the same time, the switch 282 is opened, thus deenergizing the coils 280 and 281.

The coil of the switch 292 (lower right Fig. 1) is connected in parallel with the two ratchet mechanism coils 283 and 284. This is a time delay relay which picks up its contacts 292 a predetermined time after the coil is energized. Its purpose is to provide sufficient time for the voltage to build up on motor 21 to make sure that voltage relay 294 picks up if there is excessive voltage.

The continuance of dynamic braking is controlled by the V3 relay (right center Fig. 1) whose coil is connected across the entire braking resistor 25 in series with resistors 300, 301 and 302 (bottom Fig. 2). It will be noted that the braking controller switch 226 is opened when the controller moves to the second position and thereafter remains open. Consequently, when the braking controller moves to the second position, the CR4 coil is deenergized and its switches 238 and 239 drop open. The opening of switch 238 deenergizes braking switches to interrupt the braking operation unless the V3 switch has picked up and closed its switch 303 to establish a parallel circuit.

This leaves the control of the braking circuits up to the V3 coil which drops out at a predetermined minimum vehicle track speed such as 10 or 12 miles an hour to discontinue the dynamic braking. The V3 coil is thus a low vehicle speed responsive dynamic braking cutout. After the discontinuance of the dynamic braking, air brakes are applied to the locomotive to bring the train to a stop.

When dynamic braking is discontinued, the coil 252 (lower left Fig. 1), connected across a section 25a of the dynamic braking resistor, is deenergized along with the deenergization of the resistor, and the valve 254 turns in accordance with its bias to the position shown in the drawing. This admits compressed air from the pipe 206, assuming the air brakes on the cars are applied, to the valve 255 whereby the valve is moved to the right against the spring 256 to a position to admit compressed air from the supply pipe 257 to the locomotive air brake cylinders 258 (only one of which is shown). The locomotive air brakes are then applied along with the air brakes on the cars. When the car air brakes are released, whereby the air is exhausted from the pipe 206, the spring 256 operates the valve 255 to exhaust the air from the locomotive brake cylinders 258.

The air pressure applied to the train brakes is gradually reduced after its first application so as to gradually reduce the brake pressure in accordance with standard practice this being effected by conventional automatic air brake valve 372 (top Fig. 7). This reduced air brake pressure is utilized to change the adjustment of the KWB relay by means of a diaphragm pressure responsive device 304 (center Fig. 1) connected to operate a plunger against a lever arm 305 of the relay having a pivot 305a. Pressure of the plunger tends to increase the setting of the relay. It will be understood that the device 304 is connected to the air pressure supply pipe 206. As the pressure is reduced, the pressure of the device 304 is reduced whereby the setting of the KWB relay is lowered and thus the dynamic braking effort is reduced.

As the braking controller is moved forward, the resistance 103 is gradually cut out in steps up to and including the 8th position, thus gradually increasing the excitation of the field winding 18. This circuit for the field winding established on the first position of the braking controller is from the conductor 92 through the upper and third braking controller switches, the resistor 103, conductor 104, EFB switch 250b, conductor 105 and the field winding to ground.

On the 7th, 12th and 17th steps of the braking controller, the switch 306, 307, 308 of the braking controller are closed whereby the B8, B7 and B6 (bottom Fig. 2) switches are closed in the order mentioned to short circuit sections of the braking resistor 25 and also in the order mentioned, short circuit the resistances 300 and 301 in the circuit of the V3 coil so as to regulate its sensitivity to the changed braking resistor.

On the 7th, 12th and 17th positions, it will be noted that sections of the resistance 103 are reinserted in the field winding circuit, these sections being thereafter short circuited before the next portion of the braking resistor is cut out. On the 11th, 16th and 20th positions, the resistance 103 is entirely cut out.

Also in the 11th and 16th positions, the lowermost braking controller switch is closed which holds the CLB relay open until the current has dropped to a much lower value than normally held so as to prevent exceeding 1400 amps. when the next notch is taken.

Another feature is the independent air cylinder 309 (lower left Fig. 1) which is connected to a separate independent air brake supply system (Fig. 7) on the locomotive for use when the locomotive is operated separately for switching operations or with very light trains. When the independent locomotive air brakes are applied, the air cylinder 309 connected thereto operates a plunger to open the switch 310 thereby preventing the energization of the coil 209 and consequently preventing the automatic application of dynamic braking.

In the diagrammatic representation of the air brake system for the locomotive and the cars drawn by it, shown in Fig. 7, the manually operated independent air valve 370 is used to apply the locomotive driver wheel brakes 258 and the locomotive guiding truck wheel brakes 371. The automatic air valve 372 is also manually operated and operates to apply the air brakes on the locomotive and also the train air brakes 373 on the cars drawn by the locomotive. Air is supplied under a predetermined pressure from a main reservoir 374 through the pipe 375 and its branches to the independent air valve 370, the automatic air valve 372, and to the relay valves 376 and 377.

In its operation the independent air valve 370 is manipulated manually to supply air at a desired pressure from the main reservoir 374 to a pipe 378 leading to the relay valve 376. The relay valve operates in response to the pressure in the pipe 378 to feed air into the locomotive air brake pipe 206 from the main reservoir at a pressure bearing a predetermined relation to the pressure in the pipe 378. This pressure in the pipe 206 is applied directly to the guiding truck brakes 371 and these brakes are therefore applied with a pressure proportional to the air pressure in the pipe 206.

Assuming that dynamic braking is not being used and, therefore, that the coil 252 is deenergized, the valve 254 is in position to connect the pipe 206 to a pipe 379 leading to the second relay valve 377. This relay valve 377, which includes the functions of the valve 255 (Fig. 1, lower left), operates in a manner similar to the valve 376 to feed air to the locomotive brakes 258 from the main reservoir at a pressure bearing a predetermined relation to the pressure in the pipe 206.

The automatic air valve 372, when in a position to release the train brakes 373, applies air pressure of a predetermined value from the main reservoir 374 to the train air brake or pipe line 380. To apply the train brakes, the automatic valve is manipulated manually to reduce the air pressure in the pipe 380 in a conventional manner. At the same time, however, the automatic air valve supplies air from the reservoir 374 to a pipe 381 leading to the relay valve 376. This air pressure in the pipe 381 is proportional inversely to the air pressure in the pipe 380 which latter pressure is being reduced. It operates the relay valve 376 to admit air to the pipe 206 and apply the locomotive air brakes in the manner previously described in connection with the independent valve. The train air brakes and the locomotive air brakes are thus all applied simultaneously with predetermined relative braking forces by manipulation of the automatic valve.

When electric dynamic braking is established, the coil 252 is energized to turn the valve 254 to a position exhausting the air from the locomotive driver wheel brakes 258 whereby these air brakes are released. It will be understood that these locomotive driver wheels are the ones driven by the electric motors.

The various control devices operated in response to air brake air pressure and previously described are shown in Fig. 7. The operating device 309 (Fig. 1, lower left) is connected to the pipe 378 so that it is operated to open its switch 310 only in response to manipulation of the independent valve 370 to apply the locomotive brakes.

*Manual operation of braking controller*

When the handle 202 (lower left Fig. 1) of the braking controller is turned manually for dynamic braking, it turns the shaft 217, winding up the spring 218, and closes the switch 311 which closes a short circuit around the switch 208 and thereby energizing the coil 209 through the switch 310. This opens the air valve 213 and admits air at a suitable low pressure such as 35 lbs. per square inch from a supply pipe 312 and reducing valve 313, the valve 216 being biased by a spring to the position shown so as to connect the cylinder 203 with the reducing valve. This low pressure air supplied to the cylinder 203 assists the operator in turning the handle 202 although the effort applied by the cylinder 203 at this low pressure is not great enough by itself to turn the braking controller.

The switches 243 and 244 (left center Fig. 2) are operated in response to the back steam pressure generated in the water-cooled pipes from the resistor 25 during dynamic braking, these switches being operated respectively by fluid cylinders 314 and 315 (left center Fig. 2 and Fig. 4) which as shown in Fig. 4 are connected to points of the resistor adjacent the injectors 268 and 269. In the event that this steam pressure becomes excessive, at one or more points, the corresponding switches are opened and the dynamic braking operation thereby interrupted temporarily to be resumed when the switches reclose in accordance with their spring or other biases upon reduction of the steam pressure.

The switch 245 (left center Fig. 2) biased open by suitable means such as a spring (not shown) is operated to the closed position by a cylinder 316 which is connected to the cooling water inlet pipe for the braking resistor as indicated in Fig. 4. In the event of failure of the cooling water supply, the switch 245 opens in accordance with its bias and interrupts the dynamic braking until the supply of cooling water is returned.

During motoring operation, a signal light 317 (right center Fig. 2) is operated by the CLR relay in case the motor current reaches a value higher than the predetermined maximum permissible value. This light is energized through a CLR switch 318 which is closed when the CLR relay has inserted all its resistance 98a in the circuit of the field winding 18 and therefore cannot further reduce the current. The circuit for the lamp from a conductor 72 through the conductor 73, the lamp 317, the switch 319, conductor 320, CLR switch 318, conductor 321, switch 322 to ground. This signal light indicates to the motorman that he is advancing the acceleration controller too fast and should return it somewhat toward off position until such time as the current is reduced to the maximum permissible value. If the locomotive is running with controller 26 full on and the motors in the full parallel position and a heavy grade is encountered the signal lamp would indicate to the operator that he should drop the controller 26 back to the next lower motor combination. This signal lamp supplements the meter 126 (top Fig. 2) which the motorman should watch. Another signal lamp 323 (right center Fig. 2) is also provided whose circuit is controlled by normally opened switch 324 operated by a fluid cylinder 325. This cylinder is connected to the condenser 12a (Fig. 4) and operates in response to excessive steam pressure in the condenser to close the switch 324 and light the lamp 323. This excessive condenser pressure is also an indication of excessive load and it may be caused by a change in altitude. The pressure switch 325 also has normally closed contacts 324a which when opened insert resistance 325a in the exciter field to reduce the load on excessive condenser pressure. The lamp 323 is also a signal to the motorman to return the master controller part way back to the off position.

The P7 and P3 switches (Fig. 3) and the SP4 switch 158 (lower center Fig. 3) when closed, short circuit respectively transition resistances 326, 327, and 328. These resistances are of low ohmic value and high current carrying capacity. They are temporarily inserted in the series parallel and parallel connections of the motors as the case may be, as current stabilizing influences and momentarily thereafter are short circuited by their respective switches to complete the connections.

For operating two locomotives in multiple, the normally closed switch 329 (top Fig. 2) is opened. In single unit operation the resistance 330 (top Fig. 2) is in parallel with the KWR voltage coil 133 and in multiple unit operation, the KWR voltage coil of the second locomotive is connected in the place of this resistor.

The exciter 17 is provided with an auxiliary differential field winding 334 (top Fig. 2) which is energized in accordance with the generator current from the shunt 129 in parallel with the current coil 128 of the KWR relay. This differential field 334 gives the generators a compounding effect.

*Modified system, Fig. 6*

In Fig. 6, we have shown a fragmentary view of a modified form of our invention. It will be understood that for purposes of clarity and simplicity, only so much of the system is disclosed in Fig. 6 as is necessary to an understanding of the operation of the modifications. Actually the modifications of Fig. 6 are included in the system previously described.

One of the principal changes in the modified form of Fig. 6 is the elimination of the CLR and KWR relays and the addition of certain apparatus shown in Fig. 6.

It will be understood that in Fig. 6, parts and conductors which are the same as those in Figs. 1, 2, and 3 have been given the same reference characters as in the Figs. 1, 2, and 3. The controller 26 is shown only to the extent necessary for the control of the resistance 137.

In Fig. 6, a resistance 335 is included in series with the resistances 94 and 96 which are in the circuit of the exciter field 18. Normally this resistance 335 is short circuited by a tapered bridging contact 336, the contact being held in its uppermost position so as to short circuit the resistance by means of a coil FTR when the coil is energized. Operated with the bridging contact 336 is a FTR switch 337, the switch being opened when the FTR coil is energized.

The purpose of the resistance 335 is to momentarily decrease the excitation of the field 18 while the motor connections are being changed. It will be understood that when the motor connections are opened, as during the change from series to parallel, load is taken momentarily off the generators. This tends to cause the steam turbine to increase in speed and to prevent this, the automatic steam regulator on the turbine very greatly reduces the supply of steam. Then, when the motors are reconnected to the generators, load being thereby applied, it is possible that the speed of the turbine will be greatly reduced before the turbine governor can reapply a sufficient amount of steam.

When the VI coil (center Fig. 3) picks up ready for a transfer of connections, it first opens its switch 338 which removes a short circuit from the coil 339 so that the coil 339 is energized and its switch 339a opened. The opening of the 339a switch deenergized the FTR coil and the bridging contact 336 drops quickly downward to its lowermost position shown in the drawing thereby inserting the resistance 335 in the circuit of the field winding 18 (right center Fig. 6). Also when the bridging contact has reached its lowermost position, the FTR switch 337 is closed which switch is in series with the VI switch 340. Therefore, the transfer circuit through the SPTR coil or the PTR coil, as the case may be, is not completed to initiate the transfer of connections until after the resistance 335 has been inserted in the circuit of the field 18 and the switch 337 closed.

When the transfer has been completed, the VI coil allows its contacts to drop by reason of its reduced excitation from the reduced generator voltage, thus reclosing its switch 338 which again shorts the coil 339. The 339 switch thereupon closes and energizes the FTR coil which raises the bridging contact 336 and opens the switch 337. The raising movement of the bridging contact 336 is retarded by means of a suitable timing device 341 so that a predetermined time such as three seconds is required for the bridging contact to be lifted to a position to short circuit the entire resistance 335. This gradually increases the excitation of the field 18 to its normal value and thereby gradually applies load to the turbine.

In changing the connections from series to series parallel, the coil 339 is in series with a SP4 switch 342 and P8 switches 343 and 344 together with a resistance 345 of sufficient value to prevent a short circuit through the switch 338. All three of these switches are closed when the motors are connected in series. When the series parallel position is established, the SP4 switch 342 opens and prevents reenergization of the coil 339, even though the generator voltage becomes high enough to pick up the VI relay again, provided the reversing switch 28 has been turned no farther than the series parallel position.

When the series parallel connections are established, the coil 339 is inserted in circuit with the P8 switch 344 and an SP3 switch 346. In making the transfer to the series parallel connections, the SP3 switch 346 is picked up. If the controller 28 has not been turned to the parallel position, then the wire 175 is not energized and, therefore, the coil 339 cannot be energized. When the parallel connection is established, the P8 switch 344 opens thereby preventing the reenergization of the coil 339, even though the generator voltage becomes high enough to pick up the VI relay.

The relay switch 347 (bottom Fig. 6) is operated by a current coil 348 and a voltage coil 349. The current coil 348 is connected across the shunt 129 in the armature circuit of the generators 10 and 11 so that it is energized in response to the armature current. The coil 349 is energized from a transformer 350 having preferably a 1:1 ratio which is connected across the armature of the metadyne exciter 17. When the exciter voltage is changing because of the opening of the relay switch 347, a voltage is induced in the transformer and current supplied to the coil 349 in a direction to exert a force on the common armature in opposition to the coil 348. This damps the operation of the relay 347 to prevent hunting and makes the relay drop out sooner after it has picked up.

In the position of the switch 347 shown in the drawings, i. e., with its lower pair of contacts closed, a resistance 351 is connected in parallel with a resistance 352 in the circuit of the exciter field 18 which gives a high value of current in the field 18 for high excitation of the exciter. In the event of current in the generator circuit higher than a predetermined maximum value, the current coil 348 lifts the bridging contact of the switch 347 to open the lower pair of contacts which increases the resistance in the circuit of the field winding 18 by cutting out the resistance 351 to thereby reduce the excitation of the generators and the load. In case the switch 347 is operated to its upper position to close its upper pair of contacts, it connects a resistance 313 in parallel with the field 18 for a still further weak field. This regulatory action limits the armature current to a predetermined maximum, such as 3200 amperes, regardless of what the load demands may be.

The relay switch 353 (bottom Fig. 6) is operated by a centrifugal device 354 driven by the turbine 12 so as to be responsive to the speed of the turbine through, for example, a belt connected to its driving pulley 355. The relay 353 controls the resistances 356 and 357 in the circuit of the field winding 18. In the low speed position as shown in the drawings, its upper pair of contacts are closed connecting the resistances 356 in parallel with the field winding 18 for a weak field. When the turbine is operating at normal speed, the centrifugal device moves the bridging contact of the relay 353 to its lowermost position to close its lower pair of contacts and thus connects the resistance 357 in parallel with the resistance 352 for a high current through the field winding 18 and, therefore, a strong field. This relay 353 thus operates to lighten the load on the turbine upon a decrease in speed below normal which may be due, for example, to an insufficient supply of steam to the turbine by reason of which the turbine speed drops regardless of the effect of the speed governor 358 in controlling the steam supply to the turbine. Preferably, this relay is adjusted to operate at a speed somewhat lower than the speed of operation of the turbine steam governor. Its regulatory action normally is on its lower pair of contacts.

Another feature of Fig. 6 is a mechanical connection between the centrifugal steam governor 358 of the turbine and the relay 339. The movable governor 358 is driven in any suitable manner by the turbine 12 and controls a valve 359 in the steam supply pipe 360 leading to the turbine so as to maintain a predetermined turbine speed. This centrifugal device is connected as shown through a rod 361 to the plunger of the relay 339 so that when the relay 339 is picked up, the spring 362 on the steam governor is tensioned and the governor thereby operated to reduce somewhat the supply of steam to the turbine before the motor connections are actually changed. As a result of this action, when the relay 339 drops closed again, the steam valve 359 is immediately opened somewhat by the turbine governor and the turbine speed begins to pick up immediately in anticipation of the increased load. This effect, and the gradual short circuiting of the resistance 335, reapplies slowly the load on the turbine after a change in motor connections and avoids a momentary decrease in turbine speed upon the reapplication of load which might otherwise result from a substantial closure of the steam valve 359 by the governor 358 during the time that the load is taken off in the transfer of the motor connections.

Another feature is a second switch 363 operated by the coil 339 which, when the coil picks up its relay, short circuits a portion of a resistance 364 in series with the V1 coil. This increases the excitation of the V1 coil during the time that relay 339 is picked up and while the motor connections are being changed to avoid the possibility of the V1 relay dropping during the transfer of connections because of a decrease in generator voltage from a reduction in turbine speed.

As in the arrangement of Fig. 1, the resistance 137 is included in circuit with the V1 coil for the purpose of changing the calibration of that coil. The value of this resistance is varied by the four lower segments on the controller 26, shown in Fig. 6. The upper of these segments connects the upper end of the resistance 137 to ground in all running positions of the controller. The lowermost of these segments connects one side of the V1 coil directly to ground in positions 1 to 15 inclusive whereby full armature voltage is applied to the coil. In positions 16 and 17, a section of the resistance of 157 is connected in the circuit of the V1 coil so that a higher generator voltage is required to pick up its armature and in the 18th and 19th positions, an additional section of the resistance 137 is included in circuit with this coil. In the 20th and 21st positions, the entire resistance 137 is connected in circuit with the V1 coil.

A manually operated switch 364a is closed on operation of a locomotive as a single unit and connects a resistance 365 in parallel with the V1 coil. When two locomotives are operated in parallel, this switch 364a will be opened and the V1 coil of the second unit connected in place of the resistance 365 which has substantially the same resistance as the V1 coil.

It will be noted further that in the arrangement of Fig. 6, the resistance 103 is used only during braking, the additional resistances 351, 352, 356 and 357 being provided for use during motoring operation only. It will be understood that the controllers 26 and 27 are provided with segments and contacts for gradually short circuiting the resistances 94, 96 and 103 and with additional control switches as disclosed in Fig. 1.

The prime electric generator system disclosed in this application, including features of control of the electric generator in response to operating conditions of the prime mover apparatus, control of the prime mover apparatus in response to operating conditions of the electric generator, and control of the load on the prime mover, is described and claimed in our Patent No. 2,245,083, issued June 10, 1941, for Electric vehicle drive system.

The manual and automatic motor control system for acceleration of the vehicle is described and claimed in our Patent No. 2,245,092, issued June 10, 1941, for Vehicle drive system.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States, is:

1. In a vehicle drive system, a prime mover, an electric generator driven by said prime mover, a plurality of vehicle driving motors, an exciter generator driven by said prime mover, a master controller movable to connect said motors in series with each other to said generator and to establish connections for the supply of field excitation current from said exciter to said generator, a field winding for said exciter, a resistance in series with said field winding, connections for controlling said resistance by said master controller, means responsive to the voltage of said generator for changing the connections of said motors to said generator from series to parallel, a dynamic braking resistor and a braking controller for controlling the connections of said motors with said resistor for dynamic braking.

2. In a vehicle drive system, a prime mover, an electric generator driven by said prime mover, a plurality of vehicle driving motors, a metadyne exciter generator driven by said prime mover, a master controller movable to connect said motors in series with each other to said generator and to establish connections for the supply of field excitation current from said exciter to said generators, a field winding for said exciter, a resistance in series with said field winding, connections for controlling said resistance by said master controller, means responsive to the voltage of at least one of said generators for changing the connections of said motors to said generators from series to parallel independently of said controller, a dynamic braking resistor, a braking controller for controlling the connections of said motors with said resistor for dynamic braking, and means operated by said master controller for disabling said braking controller when said master controller is in a running position.

3. In a vehicle drive system, a prime mover, an electric generator driven by said prime mover, a vehicle driving motor, a master controller movable to connect said motor to said generator and to establish connections for the supply of field excitation current to said generator, means operated by said master controller for controlling the amount of generator excitation to control the speed of said motor, a dynamic braking resistor, a braking controller for controlling the connections of said motor with said resistor for dynamic braking, driving means for said braking controller, and means responsive to the current in said braking resistor for controlling said driving means.

4. In a vehicle drive system, a prime mover, an electric generator driven by said prime mover, a vehicle driving motor, a master controller movable to connect said motors to said generator and to establish connections for the supply of field excitation current to said generator, means operated by said master controller for controlling the amount of generator excitation to control the speed of said motor, a dynamic braking resistor, a braking controller for controlling the connections of said motor with said resistor for dynamic braking, driving means for said braking controller, and means responsive to the current in said braking resistor and the voltage across said braking resistor for controlling said driving means.

5. In a vehicle drive system, a prime mover, an electric generator driven by said prime mover, a vehicle driving motor, a master controller movable to connect said motor to said generator and to establish connections for the supply of field excitation current to said generators, a dynamic braking resistor, a braking controller for controlling the connections of said motor with said resistor for dynamic braking, driving means for operating said braking controller, a source of variable pressure fluid supply, means responsive to the fluid pressure in said source for controlling said driving means for operation of said braking controller, a spring connection between said driving means and said braking controller, a step-by-step release mechanism for controlling the movement of said braking controller, and means responsive to the current in said braking resistor for controlling said release mechanism.

6. In a vehicle drive system, a prime mover, an electric generator driven by said prime mover, a plurality of vehicle driving motors, a master controller movable to connect said motors to said generator and to establish connections for the supply of field excitation current to said generator, means operated by said master controller for controlling the amount of generator excitation to control the speed of said motors, a dynamic braking resistor, a braking controller for controlling the connections of said motors with said resistor for dynamic braking, an air pressure motor for operating said braking controller, an air pressure supply source, conduit means for connecting said air supply source to said air motor for operation of said braking controller, a spring connection between said air motor and said braking controller, a step-by-step release mechanism for controlling the movement of said braking controller, means responsive to the current in said braking resistor for controlling said release mechanism and a handle connected to said spring for manual operation of said braking controller.

7. In a vehicle drive system, a prime mover, an electric generator driven by said prime mover, a vehicle driving motor, a manually operable master controller movable to connect said motor to said generator and to establish connections for the supply of field excitation current to said generator, means operated by said master controller for controlling the amount of generator excitation to control the speed of said motor, a dynamic braking resistor, a braking controller for controlling the connections of said motor with said resistor for dynamic braking, an air pressure motor for operating said braking controller, an air pressure supply source, conduit means for connecting said air supply source to said air motor for operation of said braking controller, a spring connection between said air motor and said braking controller, a step-by-step release mechanism for controlling the movement of said braking controller, means responsive to a voltage across said braking resistor for controlling said release mechanism, a handle connected to said spring for operation of said braking controller, and means operated by said handle for connecting said air motor to a source of low pressure air supply whereby said air motor assists in the operation of said braking controller by said handle.

8. In a vehicle drive system, a prime mover, an electric generator driven by said prime mover, a vehicle driving motor, a master controller movable to connect said motor to said generator and to establish connections for the supply of field excitation current to said generator, means operated by said master controller for controlling the amount of generator excitation to control the speed of said motor, a dynamic braking resistor, a braking controller for controlling the connections of said motor with said resistor for dynamic braking, an air motor, a spring connection between said air motor and said braking controller, a handle connected to said spring for operation of said braking controller, switching means operated by said handle for connecting said air motor to a source of air supply whereby said air motor assists in the operating of said braking controller by said handle.

9. In a vehicle drive system, a prime mover, an electric generator driven by said prime mover, a vehicle driving motor, a manually operable master controller movable to connect said motor to said generator and to establish connections for the supply of field excitation current to said generator, means operated by said master controller for controlling the amount of generator excitation to control the speed of said motor, a dynamic braking resistor, a braking controller for controlling the connections of said motor with said resistor for dynamic braking, an air motor, a spring connection between said air motor and said braking controller, a handle connected to said spring for operation of said braking controller, switching means operated by said handle for connecting said air motor to a source of air supply whereby said air motor assists in the operation of said braking controller by said handle, a step-by-step release mechanism for controlling the movement of said braking controller, and means responsive to the current in said braking resistor for controlling said release mechanism.

10. In a vehicle drive system, a prime mover, an electric generator driven by said prime mover, a vehicle driving motor, a master controller movable to connect said motor to said generator, an exciter generator connected to supply current to the field winding of said generator, a field winding for said exciter, a resistance in series with said field winding, connections for controlling said resistance by said master controller, a dynamic braking resistor, a braking controller for controlling the connection of said motor with said resistor for dynamic braking, and connections whereby said braking controller controls the excitation of the field winding of said exciter.

11. In a vehicle drive system, a prime mover, an electric generator driven by said prime mover, said generator being provided with a field winding, a vehicle driving motor provided with a field winding, a master controller movable to connect said motor to said generator, an exciter generator connected to supply current to the field winding of said generator, a field winding for said exciter, a resistance in circuit with said exciter field winding, connections for controlling said resistance by said master controller, a dynamic braking resistor, a braking controller for controlling the connection of said resistor with said motor for dynamic braking and the connection of the field winding of said motor with said exciter for dynamic braking.

12. In a vehicle drive system, a prime mover, an electric generator driven by said prime mover, said generator being provided with a field winding, a vehicle driving motor provided with a field winding, a master controller movable to connect said motor to said generator, a metadyne exciter generator connected to supply current to the field winding of said generator, a field winding for said exciter, a resistance in series with said exciter field winding, connections for controlling said resistance by said master controller, a dynamic braking resistor, a braking controller for controlling the connection of said resistor with said motor for dynamic braking and the connection of the field winding of said motor with said exciter for dynamic braking, and connections whereby said braking controller controls the excitation of the field winding of said exciter.

13. In a vehicle drive system, a prime mover, an electric generator driven by said prime mover, a vehicle driving motor, a master controller movable to connect said motor to said generator and to establish connections for the supply of field excitation current to said generator, a metadyne exciter generator connected to supply current to the field of said generator, a field winding for said exciter, a resistance in series with said field winding, connections for controlling said resistance by said master controller, a tubular dynamic braking resistor, a braking controller for controlling the connection of said motor with said resistor for dynamic braking, means for passing cooling water through said resistor, and means operated by a predetermined steam pressure in said dynamic braking resistor for disabling said braking connections.

14. In a vehicle drive system, a prime mover, an electric generator driven by said prime mover, a vehicle driving motor for said vehicle, a master controller movable to connect said motor to said generator and to establish connections for the supply of field excitation current to said generator, a dynamic braking resistor, a braking controller for controlling the connection of said motor with said resistor for dynamic braking, a step-by-step release mechanism for controlling the movement of said braking controller, a braking current limit relay responsive to the current in said dynamic braking resistor, and means operated by said braking current limit relay for controlling the operation of said release mechanism.

15. In a vehicle drive system, a prime mover, an electric generator driven by said prime mover, a plurality of driving motors for said vehicle, a master controller movable to connect said motors to said generator and to establish connections for the supply of field excitation current to said generators, a resistance in said field connections controlled by said master controller, a dynamic braking resistor, a braking controller for connecting said motors with said resistor for dynamic braking, a resistance in exciter field connections controlled by said braking controller, a step-by-step release mechanism for controlling the movement of said braking controller, a braking current limit relay responsive to the current in said dynamic braking resistor, and means operated by said braking current limit relay for controlling the operation of said release mechanism.

16. In a vehicle drive system, a prime mover, an electric generator driven by said prime mover, a vehicle driving motor for said vehicle, a master controller movable to connect said motor to said generator and to establish connections for the supply of field excitation current to said generator, a dynamic braking resistor, a braking controller for controlling the connections of said motor with said resistor for dynamic braking, a step-by-step release mechanism for controlling the movement of said braking controller, a braking kilowatt relay responsive to the current in said braking resistor and a voltage across said braking resistor and means operated by said braking kilowatt relay for controlling the operation of said release mechanism.

17. In a vehicle drive system, a prime mover, an electric generator driven by said prime mover, a vehicle driving motor, a master controller movable to connect said motor to said generator and to establish connections for the supply of field excitation current to said generator, a dynamic braking resistor, a braking controller for controlling the connection of said motor with said resistor for dynamic braking, a step-by-step release mechanism for controlling the movement of said braking controller, a braking current limit relay responsive to the current in said dynamic braking resistor, means operated by said braking current limit relay for controlling the operation of said release mechanism, a braking kilowatt relay responsive to the current in said braking resistor and a voltage across said braking resistor, and means operated by said braking kilowatt relay for controlling the operation of said release mechanism.

18. In a vehicle drive system, a vehicle driving motor, a dynamic braking resistor, a braking controller for controlling the connections of said motor with said resistor for dynamic braking, driving means for said braking controller, means responsive to the energy input to said braking resistor for controlling said driving means so as to limit said energy input to a predetermined maximum value, air operated braking means, conduit means for supplying air under pressure to said air braking means, and means responsive to pressure of air in said conduit means for changing the setting of said energy responsive means thereby to change said limiting energy value.

19. In a vehicle drive system, an electric vehicle driving motor, a dynamic braking resistor for said motor, a braking controller movable from a predetermined position to another position to connect said resistor to said motor in a dynamic braking circuit and thereafter movable to exclude said resistor in sections from said braking circuit, driving means for said braking controller, control means for controlling the movement of said driving means to exclude said resistor, and separately operable means responsive, respectively, to the current in said resistor, the voltage across said resistor and the kilowatt input to said resistor for actuating said control means to control the advance movement of said controller and thereby control the exclusion of said resistor so as to limit said current, voltage and kilowatt input to predetermined maximum values.

20. In a vehicle drive system, an electric vehicle driving motor, a dynamic braking resistor for said motor, a braking controller movable from a predetermined position to another position to connect said resistor to said motor in a dynamic braking circuit and thereafter movable to exclude said resistor in sections from said braking circuit, driving means for said braking controller, fluid operated braking means for the vehicle, conduit means for supplying fluid to apply said braking means, means responsive to the fluid pressure in said conduit means for operating said driving means to establish said dynamic braking circuit when fluid is supplied to said braking means, control means for controlling the advance movement of said driving means to exclude said resistor, current responsive means connected in said braking circuit for actuating said control means to control the advance movement of said controller and thereby control the exclusion of said resistor so as to limit the current in said resistor to a predetermined maximum value.

21. In a vehicle drive system, an electric vehicle driving motor, a dynamic braking resistor, a braking controller movable to connect said resistor to said motor in a dynamic braking circuit for dynamic braking and thereafter movable to exclude said resistance in a plurality of steps from the dynamic braking circuit, driving means for said braking controller, compressed air operated braking means for the vehicle, conduit means for supplying air under pressure to said air braking means to apply said air braking means, valve means for controlling the supply of air to said conduit means thereby to control the application of said air braking means, means responsive to the air pressure in said conduit means for starting said driving means when said air braking means is applied whereupon said driving means operates said braking controller to establish dynamic braking connections and thereafter exclude said resistor from the dynamic braking circuit, means responsive to the current in said braking circuit for controlling said driving means thereby to cause said braking controller to limit the current in said braking circuit to a predetermined maximum value, and means responsive to air pressure in said conduit means for changing the response of said current responsive means so as to vary the current maintained in said braking resistor in accordance with variation in the application of pressure of said air braking means.

22. In a vehicle drive system, an electric vehicle driving motor, a dynamic braking resistor for said motor, a braking controller movable from a predetermined position to another position to connect said resistor to said motor in a dynamic braking circuit and thereafter movable to exclude said resistor in sections from said braking circuit, driving means for said braking controller, compressed air operated braking means for the vehicle, conduit means for supplying compressed air to apply said braking means, means responsive to the air pressure in said conduit means for starting said driving means to establish said dynamic braking circuit when air is supplied to said braking means, control means for controlling the advance movement of said driving means to exclude said resistor, current responsive means connected in said braking circuit for actuating said control means to control the advance movement of said controller and thereby control the exclusion of said resistor so as to limit the current in said resistor to a predetermined maximum value, and means responsive to the air pressure in said conduit means for changing the response of said current responsive means to vary said maximum current value in accordance with variations in said air pressure.

23. In a vehicle drive system, an electric vehicle driving motor, a dynamic braking resistor for said motor, a braking controller movable from a predetermined position to another position to connect said resistor to said motor in a dynamic braking circuit and thereafter movable to exclude said resistor in sections from said braking circuit, driving means for said braking controller, compressed air operated braking means for the vehicle, conduit means for supplying compressed air to apply said braking means, means responsive to the air pressure in said conduit means for starting said driving means to establish said dynamic braking circuit when air is supplied to said braking means, control means for controlling the advance movement of said driving means to exclude said resistor, and separately operable means responsive, respectively, to the current in said resistor, the voltage across said resistor, and the kilowatt input to said resistor for actuating said control means thereby to control the exclusion of said resistor so as to limit said current, voltage and kilowatt input to predetermined maximum values.

24. In a vehicle drive system, an electric vehicle driving motor, a dynamic braking resistor, a braking controller movable to connect said resistor to said motor in a dynamic braking circuit for dynamic braking, driving means for said braking controller, fluid operated braking means for the vehicle, conduit means for supplying fluid under pressure to apply said braking means, means responsive to the fluid pressure in said conduit means for operating said driving means to establish said dynamic braking circuit when fluid is supplied to apply said braking means, means responsive to the current in said resistor for releasing said fluid braking means, control means for controlling the advance movement of said driving means to exclude said resistor, and means responsive to the current in said resistor for actuating said control means to control the advance movement of said controller and thereby control the exclusion of said resistor so as to limit the current in said resistor to a predetermined maximum value.

25. In a vehicle drive system, a vehicle driving motor, a field winding for said motor, a generator for supplying current to said motor, a field winding for said generator, an exciter generator, a master controller movable to connect said motor to said generator and to connect said generator field winding to said exciter for motoring operation, a dynamic braking resistor for said motor, and a braking controller movable to connect said resistor to said motor and to connect said motor field winding to said exciter for dynamic braking.

LEWIS W. WEBB.
JACOB W. McNAIRY.